United States Patent
Butani et al.

(10) Patent No.: US 12,499,713 B2
(45) Date of Patent: Dec. 16, 2025

(54) SYSTEM AND METHOD FOR HAND GESTURE CONTROL OF CABINET X-RAY SYSTEMS

(71) Applicant: KUB TECHNOLOGIES, INC., Stratford, CT (US)

(72) Inventors: Vikram Butani, Fairfield, CT (US); Chester Lowe, Palm Springs, CA (US); Hrituja Babar, Fairfield, CT (US); Jhonah Felipe, Stratford, CT (US); Aditya Ghume, Stratford, CT (US); Mustafa Merchant, Stratford, CT (US); Karla Palma, Stratford, CT (US); Vivek Raut, Stratford, CT (US); Arpit Soni, Fairfield, CT (US); Reshma Sunny, Fairfield, CT (US); Jeet Trivedi, Fairfield, CT (US); Deeksha Khanna, Stratford, CT (US)

(73) Assignee: KUB TECHNOLOGIES, INC., Stratford, CT (US)

( * ) Notice: Subject to any disclaimer, the term of this patent is extended or adjusted under 35 U.S.C. 154(b) by 84 days.

(21) Appl. No.: 18/534,591

(22) Filed: Dec. 9, 2023

(65) Prior Publication Data
US 2024/0412562 A1 Dec. 12, 2024

Related U.S. Application Data

(60) Provisional application No. 63/471,792, filed on Jun. 8, 2023.

(51) Int. Cl.
*G06V 40/20* (2022.01)
*A61B 6/00* (2024.01)
(Continued)

(52) U.S. Cl.
CPC .............. *G06V 40/28* (2022.01); *A61B 6/467* (2013.01); *G06F 3/017* (2013.01); *A61B 6/4405* (2013.01); *A61B 6/502* (2013.01)

(58) Field of Classification Search
CPC ...... G06V 40/28; A61B 6/467; A61B 6/4405; A61B 6/502; A61B 6/4441; A61B 6/54; G06F 3/017
(Continued)

(56) References Cited

U.S. PATENT DOCUMENTS

| 2013/0225999 | A1 | 8/2013 | Banjanin et al. |
| 2015/0131778 | A1* | 5/2015 | Lowe ............. A61B 6/032 378/37 |

(Continued)

FOREIGN PATENT DOCUMENTS

| EP | 3351176 A * | 7/2018 | ........... A61B 5/0077 |
| EP | 3351176 A1 * | 7/2018 | ........... A61B 5/0077 |

OTHER PUBLICATIONS

Jacob et al. "Hand-gesture based sterile interface for the operating room using contextual cues for the navigations of radiological images" Journal of the American Medical Informaties Association. Jun. 2013, Retrieved Jan. 19, 2025, URL: https://pmc.ncbi.nlm.nih.gov/articles/PMC3715344/pdf/amiajnl-2012-001212, 4 pages.
(Continued)

*Primary Examiner* — John W Miller
*Assistant Examiner* — Omer Khalid
(74) *Attorney, Agent, or Firm* — Ziegler IP Law Group, LLC

(57) ABSTRACT

The aspects of the disclosed embodiments relate to the field of a cabinet x-ray incorporating hand gesture command operation for the production of organic and non-organic images. The computing device receives video of hand gesture data and determines, based on the video of hand gesture
(Continued)

data, a hand gesture-initiated action. In particular, the invention relates to a system and method with corresponding apparatus for commanding the cabinet x-ray unit to attain and optimize images utilizing hand-gestures.

5 Claims, 3 Drawing Sheets

(51) Int. Cl.
 *A61B 6/46* (2024.01)
 *A61B 6/50* (2024.01)
 *G06F 3/01* (2006.01)
(58) Field of Classification Search
 USPC .......................................................... 348/77
 See application file for complete search history.

(56) References Cited

U.S. PATENT DOCUMENTS

| | | |
|---|---|---|
| 2017/0123030 A1* | 5/2017 | Hengerer ................ G06F 3/017 |
| 2018/0228010 A1 | 8/2018 | Butani et al. |
| 2018/0247560 A1* | 8/2018 | Mackenzie .......... A61B 90/361 |
| 2019/0053771 A1* | 2/2019 | Butani ................... A61B 6/502 |
| 2019/0231298 A1 | 8/2019 | Behiels |
| 2021/0199603 A1* | 7/2021 | Butani ................. G01N 23/046 |

OTHER PUBLICATIONS

United States Patent and Trademark Office, International Search Report, Application No. PCT/US2024/059209, mailed Feb. 7, 2025, 2 pages.
United States Patent and Trademark Office, Written Opinion of the International Searching Authority, Application No. PCT/US2024/059209, mailed Feb. 7, 2025, 9 pages.

* cited by examiner

SYSTEM AND METHOD FOR HAND GESTURE CONTROL OF CABINET X-RAY SYSTEMS

CROSS-REFERENCE TO RELATED APPLICATIONS

This application is related to the following applications filed on 9 Dec. 2023, the disclosures of which are each, individually, incorporated herein by reference in their entireties: U.S. Ser. Nos. 18/534,584; 18/534,586; 18/534,587; 18/534,588; 18/534,589; 18/534,590 and 18/534,592.

FIELD

The aspects of the disclosed embodiments relate to the field of cabinet x-ray. In particular, the aspects of the disclosed embodiments relate to incorporating hand gesture command operation for commanding the cabinet x-ray unit to attain and optimize images.

BACKGROUND

Breast cancer is the most common cancer among women other than skin cancer, and is the second leading cause of cancer death in women after lung cancer. The American Cancer Society currently estimates that there are about 182,460 new cases of invasive breast cancer per year among women in the United States and 40,480 deaths per year from the disease. Prevention and early diagnosis of breast cancer are of foremost importance. Because early breast cancer does not produce symptoms, the American Cancer Society recommends an x-ray radiogram screening and a clinical breast examination every year for women over the age of 40. Recently, the American Cancer Society has additionally recommended an adjunctive breast MRI (magnetic resonance imaging) screening for women in certain higher-risk groups.

Lumps or abnormalities in the breast are often detected by physical examination, mammography, ultrasound, or other imaging studies. However, it is not always possible to tell from these imaging tests whether a growth is benign or cancerous.

Specimen Radiography is considered the most cost-effective screening method for the detection of breast cancer in surgically removed breast tissue. However, the sensitivity of specimen radiography is often limited by the presence of overlapping dense fibroglandular tissue in the breast specimen. Dense parenchyma reduces the conspicuity of abnormalities and thus constitutes one of the main causes of missed breast cancer diagnosis.

The advent of full-field digital detectors offers opportunities to develop advanced techniques for improved imaging of dense breasts, such as digital tomosynthesis. Some computing devices (mobile phones, tablet computers, wearable computing devices, personal digital assistants, etc.) are "hand gesture-activated" and can recognize hand gesture commands based on video of hand gesture input (a user's hand gesture).

For example, a computing device may receive hand gesture input (video of hand gesture data) with a video camera. The computing device may analyze the hand gesture input using speech-recognition techniques/software to determine a command, i.e. "search", "play", "pause", etc. and then execute a hand gesture-initiated action associated with the command. As such, a hand gesture-activated computing device may provide users with the ability to operate some features of the computing device by making hand gesture commands at the device.

It would be advantageous in breast procedure rooms to allow the medical professional to operate the cabinet x-ray unit to analyze the excised breast tissue or specimen utilizing hand gestures. For example, certain medical instruments require the medical professional to use both hands and to stand next to the patient, sometimes in an awkward position throughout the entire procedure making it difficult for the medical professional to operate other equipment. At other times it is difficult for a pathology assistant to operate equipment while dissecting tissue specimens with both hands. Currently it is believed that there is not a system or method utilizing hand gesture commands to control a cabinet x-ray system.

Today, conventional breast specimen systems can gather a digital breast specimen radiogram separately. In these systems, the radiograms of a tissue or bone specimen are viewed separately for analysis.

SUMMARY

In general, this disclosure may enable a device (cabinet x-ray system) utilizing a computer to perform a hand gesture-initiated action based on video data of hand movements. With a unit incorporating hand gesture commands, the clinician can utilize the hand gesture commands to expeditiously visualize the specimen excised from the patient without manual intervention with their gloved hands saving time for both the patient on the treatment table and the clinician.

The aspects of the disclosed embodiments relate to incorporating hand gesture command operation for the production of organic and non-organic images in cabinet X-ray. A computing device receives video of hand gesture data and determines, based on the video of hand gesture data, a hand gesture-initiated action, to a system and method with corresponding apparatus for commanding the cabinet x-ray unit to attain and optimize images utilizing hand-gestures.

The device receiving a hand gesture command via a video camera, for example, and utilizing gesture-recognition techniques/software to analyze the video data may determine one or more gesture commands for causing the device to perform gesture-initiated actions allowing the medical professional to operate the cabinet x-ray equipment utilizing hand gesture commands would free up personnel in the operating room as well as allow the medical professional to remain sterile and remain close to the patient.

Some commands may be, but are not just limited to:
Activate Window
Window Control
Touch Keyboard Control
Keyboard simulation
Key Down/Up
Mouse Simulation
Send Keystrokes
Open Default Browser
Screen Brightness
Volume Adjustment.
Run Command Prompt Commands
Open File or Website
Launch Windows Store App
Send Message
Toggle Window Topmost The embodiment as related above explains how this invention would relate to specimen radiography but the invention is not isolated to specimen radiography but may be utilized for non-destructive testing, pathology as well as any radiographic analysis, organic and non-organic, requiring a cabinet x-ray system.

A preferred embodiment system would incorporate hand gesture command into a cabinet x-ray unit allowing operation of the system freeing up the operator's hand/s.

BRIEF DESCRIPTION OF THE DRAWINGS

To further clarify the above and other advantages and features of the aspects of the disclosed embodiments, a more particular description will be rendered by reference to specific embodiments thereof that are illustrated in the appended drawings. It is appreciated that these drawings depict only typical embodiments of the invention and are therefore not to be considered limiting of its scope. The aspects of the disclosed embodiments will be described and explained with additional specificity and detail through the use of the accompanying drawings in which.

DETAILED DESCRIPTION

Figure 1:
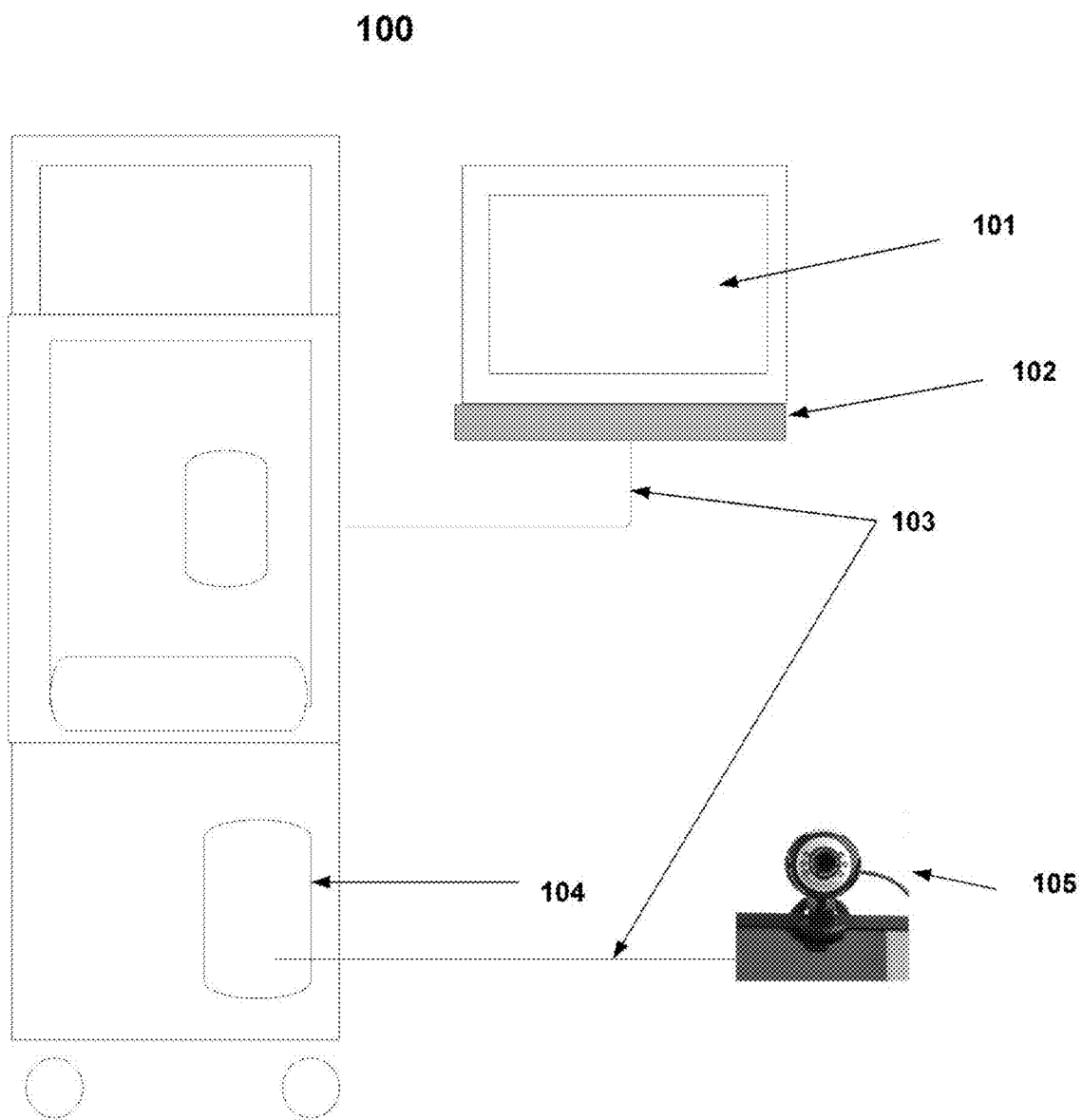
FIG. 1 is an exemplary architecture of a system incorporating aspects of the disclosed embodiments.
Figure 2:
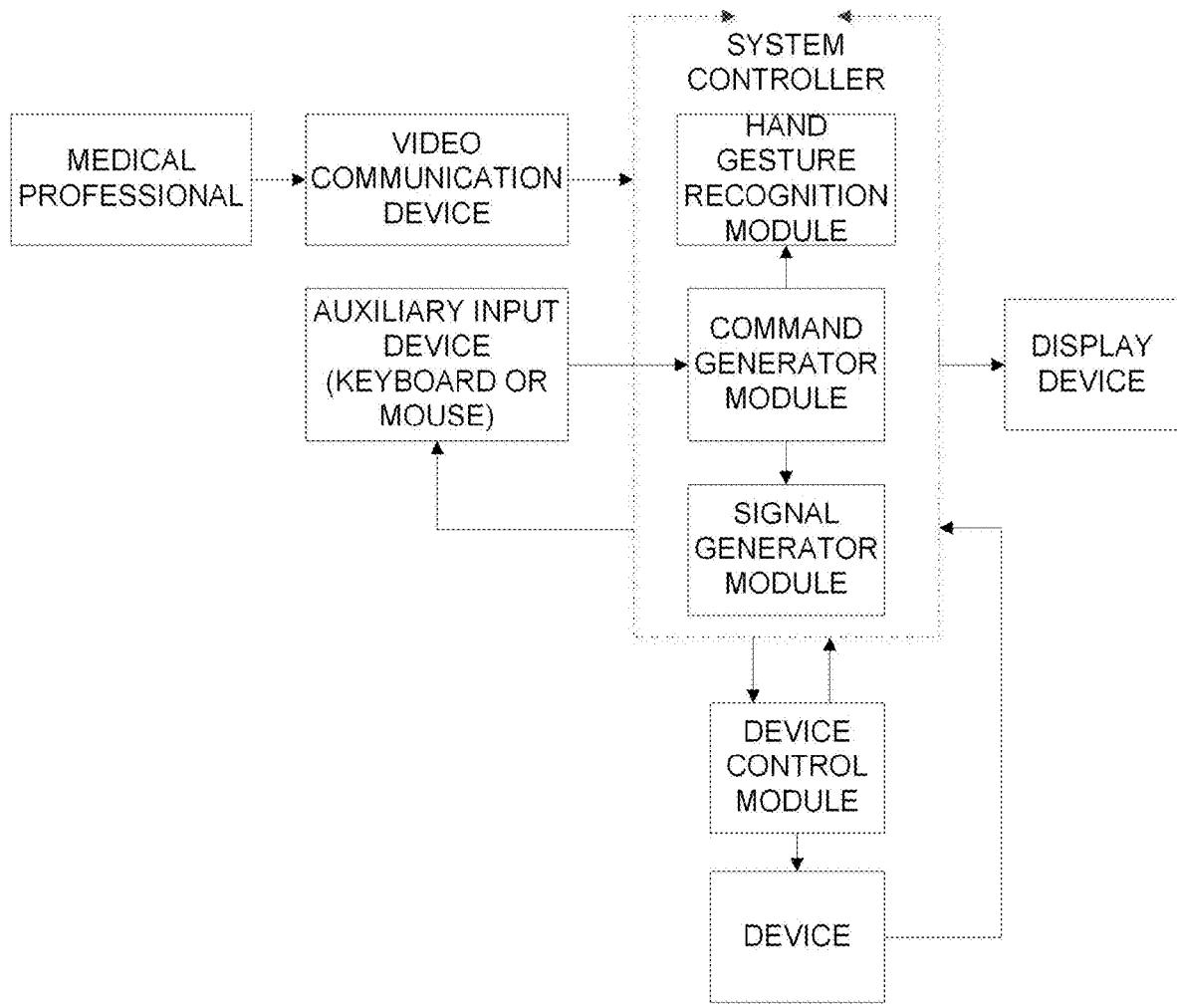
FIG. 2 illustrate a basic workflow of the one example embodiment of the present disclosure.
Figure 3:
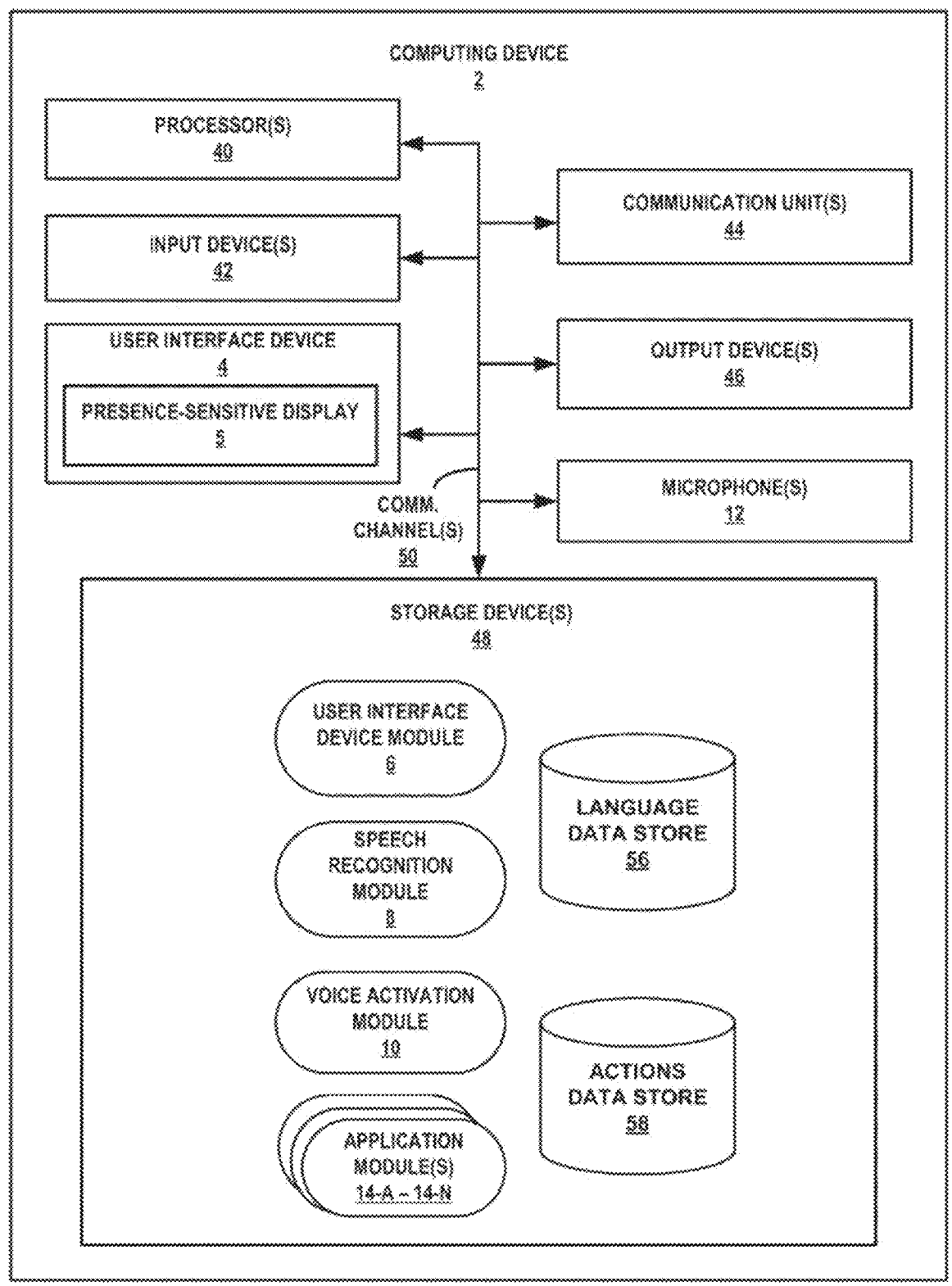
FIG. 3 is an example of a computing device utilized in the example embodiment of the present disclosure.

Reference will now be made to figures wherein like structures will be provided with like reference designations. It is understood that the drawings are diagrammatic and schematic representations of exemplary embodiments of the present disclosure, and are not limiting of the aspects of the disclosed embodiments nor are they necessarily drawn to scale. FIGS. 1-3 depict various features of embodiments of the present disclosure, which embodiments are generally directed to a system that can utilize hand gesture-initiated commands to perform functions.

Referring first to FIG. 1, there is shown an example of the embodiment of a hand gesture-initiated cabinet x-ray unit 100. Medical professional, clinician or other authorized operator looks into the video camera 105 which sends data via a cable 103 to computer 104. This, in turn, provides more flexibility for a clinician or other user of the system and simplifies the procedure. Manual input for operation of the cabinet x-ray unit 100 may be initiated via keyboard 102 and the resulting image from both the manual-initiated or hand gesture-initiated examination is displayed on the screen 101 and configured in accordance with one example embodiment of the present invention.

FIG. 2 displays the basic workflow of the cabinet x-ray unit FIGS. 1-100. FIG. 3 gives a basic workflow and components of the computing device 2. Manual Input items 42, 4, 5 are represented in FIGS. 1-102 and the hand gesture-initiated video camera 12 is previously represented in FIG. 1-105.

Processor 40 will access the storage device 48 to verify hand gesture-initiated key word utilizing the speech recognition module 8 and the hand gesture activation module 10 wherein reference will be made to both language data store 56 and actions data store 58 before actuating the application module 14-A-14-N. Note that, for clarity, only selected features of the base unit 100, basic computer 104, and the workflow of the computing device are described herein in detail. Indeed, it is appreciated that the system 100 and its individual components can include additional features and components, though not disclosed herein, while still preserving the principles of the present invention. Note also that the base computer 104 can be one of any number devices, including a desktop or laptop computer, etc.

Instead of using a keyboard or mouse, the gestures of the hand are used to control the actions of the x-ray cabinet 100 and it's computer functions. The project is based on wireless communication, where the data from the hand gestures is transmitted to the cabinet x-ray system 100 over a RF link (RF Transmitter-Receiver pair).

Surgeons must maintain a surgical sterilization status with gloves, etc. as the patient is still on the table. Sterile technique is essential to help prevent surgical site infections. With this innovation they would be able to visualize and control the cabinet x-ray system whether it be the resulting radiograph or optical image of the excised specimen taken without having to breaking scrub (remove their gloves) and resterilise.

Although the preferred embodiments described herein below are particularly applicable and advantageous for use in x-ray mammography and x-ray tomosynthesis breast cancer screening environments, they are also readily applicable for other breast imaging modalities such as breast specimen radiography and digital breast specimen tomosynthesis.

The aspects of the disclosed embodiments may be embodied in other specific forms without departing from its spirit or essential characteristics. The described embodiments are to be considered in all respects only as illustrative, not restrictive. All changes that come within the meaning and range of equivalency of the claims are to be embraced within their scope.

What is claimed is:

1. A cabinet x-ray system incorporating a hand gesture command module, comprising:
   A. a cabinet x-ray system
   B. a base unit including an image processor and a display;
   C. a video camera connected to the base unit, including:
      i. software or hand gesture-recognition module;
      ii. a system configured to receive analog signals relating to hand gesture commands;
      iii. a means to verify that a hand gesture command is recognized;
      iv. a gesture glossary;
      v. a processing unit that controls the gesture recognition modules and an analog-to-digital converter, causing the cabinet x-ray system to function; and
      vi. an interface for enabling an analog/digital signal to be transferred from the video camera to the computer of the base unit.

2. The method as defined in claim 1, further comprising responsive to determining a hand gesture-initiated action based on a video of hand gesture data, performing, by the computing device, the hand gesture-initiated action.

3. The method of claim 2 wherein, determining the hand gesture-initiated action further comprises: determining, by the computing device and based in part on a date from the computing device, a context; determined, by the computing device and based at least in part on the context, the hand gesture-initiated action.

4. The method of claim 1 wherein the items examined are organic and non-organic.

5. A computing device comprising:
   at least one processor, and
   at least one module operable by the at least one processor to:
      output, for display, verification of the speech command;

receive video of hand gesture data;
determining, based on the video of hand gesture data, a hand gesture-initiated action;
and responsive to determining the hand gesture-initiated action, output for display a change of the GUI to indicate that the hand gesture-initiated command has been determined and recognized.

* * * * *